(12) United States Patent
Thomas

(10) Patent No.: US 10,196,998 B2
(45) Date of Patent: Feb. 5, 2019

(54) ENGINE EMISSION CONTROL SYSTEM INCLUDING COMBUSTION CHAMBER TEMPERATURE MONITORING SYSTEM

(71) Applicant: GM Global Technology Operations LLC, Detroit, MI (US)

(72) Inventor: Eric D. Thomas, Shelby Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 85 days.

(21) Appl. No.: 14/465,072

(22) Filed: Aug. 21, 2014

(65) Prior Publication Data
US 2016/0053700 A1  Feb. 25, 2016

(51) Int. Cl.
| F02D 35/02 | (2006.01) |
| F02D 41/14 | (2006.01) |
| F02D 41/30 | (2006.01) |
| F02D 41/00 | (2006.01) |
| F02D 41/40 | (2006.01) |

(52) U.S. Cl.
CPC ....... F02D 41/1446 (2013.01); F02D 35/023 (2013.01); F02D 35/026 (2013.01); F02D 41/008 (2013.01); F02D 41/30 (2013.01); F02D 41/3035 (2013.01); F02D 41/40 (2013.01); Y02T 10/44 (2013.01)

(58) Field of Classification Search
CPC .... F02D 41/1446; F02D 35/023; F02D 41/40; F02D 35/026; F02D 41/3035; F02D 41/008; F02D 41/30
See application file for complete search history.

(56) References Cited

U.S. PATENT DOCUMENTS

| 3,890,942 A | * | 6/1975 | Date | F02B 19/1052 123/255 |
| 4,254,741 A | * | 3/1981 | Werling | F02D 19/081 123/1 A |
| 5,601,068 A | * | 2/1997 | Nozaki | F02D 41/005 123/568.11 |

(Continued)

FOREIGN PATENT DOCUMENTS

| CN | 1263583 A | 8/2000 |
| CN | 101358560 A | 2/2009 |

(Continued)

OTHER PUBLICATIONS

Chinese Office Action for 201510516576.8; dated Jul. 5, 2017; 13 pages.

(Continued)

Primary Examiner — David Hamaoui
(74) Attorney, Agent, or Firm — Cantor Colburn LLP

(57) ABSTRACT

An internal combustion engine control system includes at least one cylinder having a combustion chamber configured to combust an air/fuel mixture stored therein. The air/fuel mixture is configured to combust in response to reaching an autoignition temperature. At least one electronic control module is configured to determine a chamber temperature within the combustion chamber. The electronic control module controls combustion of the air/fuel mixture based on a comparison between the chamber temperature and an autoignition temperature threshold.

18 Claims, 2 Drawing Sheets

(56) References Cited

U.S. PATENT DOCUMENTS

| | | | | |
|---|---|---|---|---|
| 6,666,021 B1* | 12/2003 | Lewis | F01N 3/2006 | 60/274 |
| 7,076,360 B1* | 7/2006 | Ma | F02D 15/04 | 701/103 |
| 7,305,955 B2* | 12/2007 | Brevick | F02D 41/0082 | 123/179.21 |
| 7,469,662 B2* | 12/2008 | Thomas | F02B 19/12 | 123/258 |
| 7,640,727 B2* | 1/2010 | Kitahara | F02D 41/027 | 60/285 |
| 7,832,370 B2* | 11/2010 | Sutherland | F01L 13/0015 | 123/143 A |
| 8,434,450 B2* | 5/2013 | Durrett | F02B 17/005 | 123/295 |
| 9,273,661 B2* | 3/2016 | Kondo | F02D 41/0057 | |
| 2008/0264393 A1* | 10/2008 | Sturman | F02B 9/04 | 123/568.14 |
| 2012/0103304 A1* | 5/2012 | Kang | F02D 35/023 | 123/305 |

FOREIGN PATENT DOCUMENTS

| CN | 101558220 A | 10/2009 |
|---|---|---|
| CN | 102817737 A | 12/2012 |
| CN | 103306837 A | 9/2013 |
| CN | 103670761 A | 3/2014 |
| CN | 105247204 A | 1/2016 |
| JP | 2005330849 A | 12/2005 |
| JP | 2011001905 A | 1/2011 |
| JP | 2011220159 A | 11/2011 |

OTHER PUBLICATIONS

CN Office Action for Chinese Patent Application No. 201510516576.8, dated Jan. 5, 2018, 10 pages.

* cited by examiner

ENGINE EMISSION CONTROL SYSTEM INCLUDING COMBUSTION CHAMBER TEMPERATURE MONITORING SYSTEM

FIELD OF THE INVENTION

The subject invention relates generally to internal combustion engines, and more particularly, to engine combustion timing control systems.

BACKGROUND

Exhaust gas generated from combusting an air/fuel mixture within a cylinder of an internal combustion engine is a heterogeneous mixture that contains gaseous emissions. The gaseous emission include, but are not limited to, carbon monoxide ("CO"), unburned hydrocarbons and oxides of nitrogen ("$NO_x$") as well as particulate matter comprising condensed phase materials (liquids and solids). Combustion of the air/fuel mixture in the cylinder can burn off an amount particulate matter before the exhaust gas exits the vehicle. In the case of compression-ignition engines such as, for example, diesel engines, the air/fuel mixture autoignites based on the pressure and temperature within the combustion chamber of the cylinder. The temperature in the cylinder, however, can affect the amount of particulate matter that is burned off. For example, excessive retardation of the spark relative to the piston position may result in an inefficient burn-off of the particulate matter thereby increasing the emissions output of the engine.

Conventional methods of controlling air/fuel combustion to drive the engine are based solely on the pressure within a respective cylinder. More specifically, conventional combustion control systems sample the cylinder pressure with respect to specific positions of the piston indicating the properties of the thermodynamic cycle. However, the numerous pressure and piston position measurements are time consuming. Further, the pressure measurements may not accurately distinguish the pressures within two or more cylinders among a plurality of operating cylinders.

SUMMARY OF THE INVENTION

In one exemplary embodiment, an internal combustion engine control system includes at least one cylinder having a combustion chamber configured to combust an air/fuel mixture stored therein. The air/fuel mixture is configured to combust in response to reaching an autoignition temperature. At least one electronic control module is configured to determine a chamber temperature within the combustion chamber. The electronic control module controls combustion of the air/fuel mixture based on a comparison between the chamber temperature and an autoignition temperature threshold.

In another exemplary embodiment, a method of controlling an internal combustion engine control system comprises delivering a quantity of fuel during an injection time period into a combustion chamber of at least one cylinder to form an air/fuel mixture. The method further includes combusting the air/fuel mixture in the combustion chamber based on an autoignition temperature of the air/fuel mixture. The method further includes determining a chamber temperature within the combustion chamber during the combustion stroke and/or the expansion stroke. The method further includes controlling the combustion of the air/fuel mixture based on a comparison between the chamber temperature and an autoignition temperature threshold.

The above features of the invention are readily apparent from the following detailed description of the invention when taken in connection with the accompanying drawings.

BRIEF DESCRIPTION OF THE DRAWINGS

Other feature and details appear, by way of example only, in the following detailed description of embodiments, the detailed description referring to the drawings in which.

DESCRIPTION OF THE EMBODIMENTS

Figure 1:
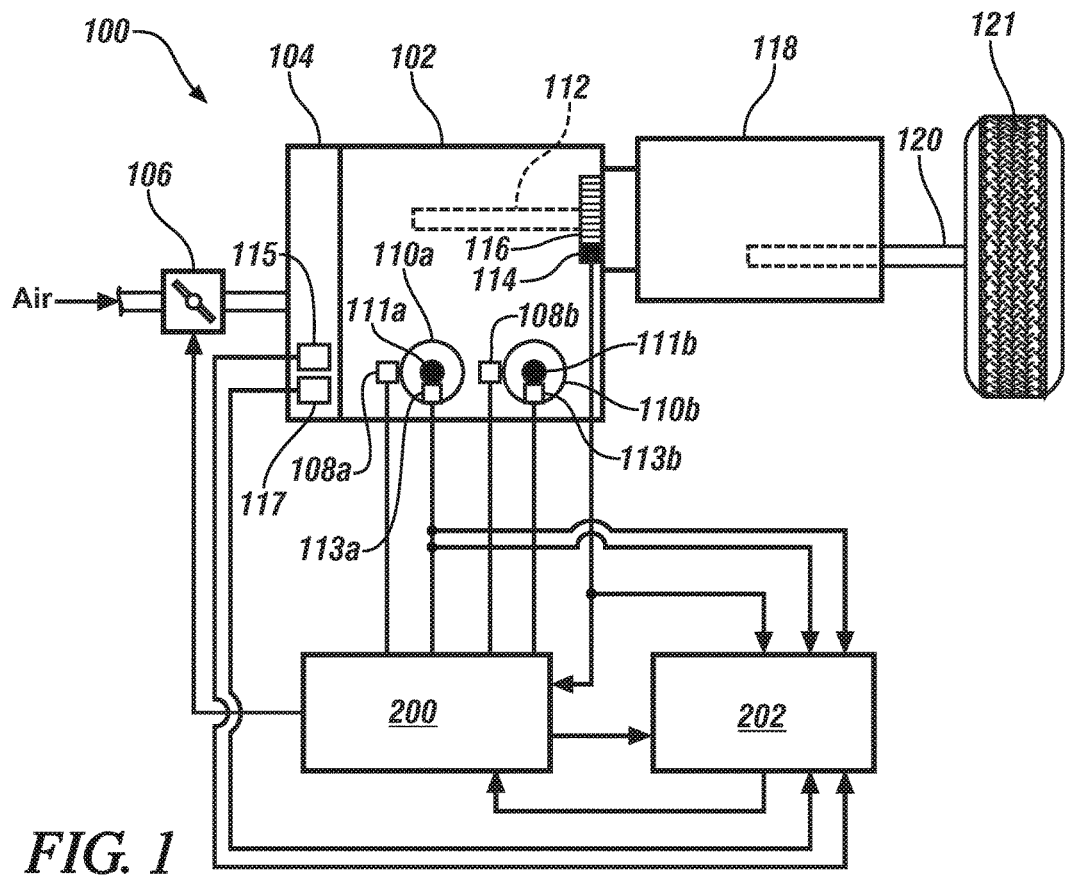
FIG. 1 is a functional block diagram illustrating a vehicle system according to an exemplary embodiment of the present disclosure.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a functional block diagram of a vehicle system 100 is illustrated according to an exemplary embodiment. The vehicle system 100 includes an engine 102 configured to generate a rotational torque. For purposes of discussion only, the engine 102 will be discussed as a diesel-type internal combustion engine. It is appreciated, however, that vehicle system 100 may be utilized with other types of internal combustion engines including, but not limited to, spark-ignition (e.g., gasoline-type) internal combustion engine. One or more systems and/or actuators of the engine 102 may be controlled by an electronic engine control module (ECM) 200 as described in greater detail below.

Air is drawn into the engine 102 through an intake manifold 104. In a case of where the engine 102 is spark-ignition internal combustion engine, for example, a throttle valve 106 regulates a mass of air drawn through the intake manifold 104. In a case where the engine 102 is a compression-ignition internal combustion engine such as a diesel engine, for example, the throttle 106 may be used to generate an intake manifold vacuum, thereby recirculating exhaust gas into the engines. This technique is typically referred to as exhaust gas recirculation (EGR), and may lower combustion temperatures and reduce NOx production as understood by one of ordinary skill in the art.

The engine 102 includes one or more fuel injectors 108a, 108b, etc., and one or more cylinders 110a, 110b, etc. The fuel injectors 108a/108b deliver fuel into the cylinders 110a/110b where it is mixed with air and/or recirculated exhaust gas to form a combustible charge (e.g., an air and fuel mixture). According to an embodiment, the ECM 200 is configured to control opening and closing of the throttle valve 106. It is appreciated, however, that individual actuator modules (e.g., a throttle actuator module and a fuel actuator module) may be provided to control the fuel injector 1108a/108b, and the throttle valve 106, respectively.

Each cylinder 110a/110b includes a piston 111a/11b moveably disposed therein. The pistons 111a/111b are coupled to a crankshaft 112. Rotation of the crankshaft 112 drives each piston 111a/111b within a respective cylinder 110a/110b. Although the engine 102 is depicted as including only the cylinders 110a and 110b, it is appreciated that the engine 102 may include any number of cylinders 110a, 110b, etc. One combustion cycle of the air/fuel mixture may include four-strokes: an intake stroke, a compression stroke, a combustion (or expansion) stroke, and an exhaust stroke.

During the intake stroke, one or more pistons 111a/111b are lowered to a bottom-most position, for example, and air is transported from the intake manifold 104 into the cylinder 110a/110b. In an exemplary embodiment, the air may be comprised of a mixture of fresh air and some recirculated exhaust gas. In the case of a compression-ignition diesel engine, for example, no fuel is introduced during this intake stroke. In the case of a spark-ignition gasoline engines, the fuel may already have been introduced upstream of the intake manifold, may be injected into the manifold slightly prior to an intake stroke, or may be injected directly into the cylinder or its intake valve passage during this intake stroke. In any case, discrete masses of "charge" fluid, in a gaseous state, are introduced into the cylinders 110a/110b. The bottom-most position may be referred to as a bottom dead center (BDC) position. A two-stroke cycle engine system can also be practiced, for example, and comprises only of a compression stroke and an expansion stroke. In this scenario, the exhaust event occurs late in the expansion stroke beginning before BDC and the intake event occurs early in the compression stroke ending after BDC.

During the compression stroke, the crankshaft 112 drives one or more pistons 111a/111b toward a top-most position, for example, thereby compressing the charge mixture (e.g., air/fuel mixture) within the cylinder 110a/110b. The top-most position may be referred to as a top dead center (TDC) position. Pressure from combustion of the charge mixture drives one or more pistons 111a/111b toward the BDC position, thereby rotatably driving the crankshaft 112. This rotational force (i.e., torque) may be the compressive force that compresses the air/fuel mixture during the compression stroke of a next cylinder in a predetermined firing order of the cylinders 110a/110b. Exhaust gas resulting from the combustion of the air/fuel mixture is expelled from the cylinder 110a/110b during the exhaust stroke.

A crankshaft sensor 114 outputs a position signal indicating a rotational speed and rotational position of the crankshaft 112. For example only, the crankshaft sensor 114 may include a variable reluctance (VR) sensor or another suitable type of crankshaft sensor 114. A gear 116 including "N" number of teeth is coupled to an end of the crankshaft 112 and is configured to rotate therewith. The crankshaft sensor 114 generates a pulsed signal in response to detecting one or more of the teeth during rotation of the gear 116. The time period between each pulse (i.e., between each detected tooth) may determine the overall speed of the crankshaft 112.

Each pulse of the signal may correspond to an angular rotation of the crankshaft 112 by an amount equal to 360° divided by N teeth. For example only, the gear 116 may include 60 equally spaced teeth (i.e., n=60) and each pulse may correspond to 6° of rotation of the crankshaft 112. In various implementations, one or more of the N equally spaced teeth may be omitted. For example only, two of the N teeth may be omitted. The one or more teeth may be omitted, for example, as an indicator of one revolution of the crankshaft 112. The crankshaft sensor 114 may generate the position signal based on a time period between the pulses, i.e., between each sensed tooth. For example only, the crankshaft sensor 114 may generate the position signal based on a period that it takes the crankshaft 112 to rotate a predetermined angle (e.g., 90°) during the expansion stroke of the cylinder 110a, 110b, etc. Based on the position signal, the position of one or more pistons 111a/111b can be determined.

The engine 102 may transfer the torque output to a transmission 118 via the crankshaft 112, and the transmission 118 transfers the torque to one or more wheels 121 via a transmission output shaft 120 as understood by one of ordinary skill in the art. In the case where the transmission 118 is an automatic-type transmission, the vehicle system 100 may include a torque transfer device, such as a torque converter, that transfers the output torque to the transmission 118.

The ECM 200 further controls the combustion timing of the engine 102. For example, the ECM 200 may output one or more electronic control signals that control one or more engine actuators to adjust a fuel injection time period (i.e., the timing of fuel injection pulses delivered to a respective cylinder 110a/110b to initiate combustion of a charge air/fuel mixture. In the case of spark-ignition-type engines, the ECM 200 may also adjust the spark timing to more precisely control the flame front before autoignition occurs and/or control the speed at which the throttle valve 106 is closed to control charge mass and charge pressure. The actuators controlled by the ECM 200 includes, but are not limited to, the throttle valve 106 and/or the fuel injectors 108a, 108b, etc. The control signal may control, for example, the opening area of the throttle valve 106, the amount of fuel injected by the fuel injectors 108a/108b, the fueling rate of the cylinders 110a/110b, and/or the time period at which one or more pulses of fuel are injected during a given cycle for a given cylinder 110a/110b.

While not shown in the exemplary embodiment of FIG. 1, the ECM 200 may also control other engine actuators. For example only, the ECM 200 may control a boost actuator module that controls boost provided by a boost device, a phaser actuator module that controls intake and exhaust cam phaser positions, and/or other suitable engine actuators as understood by one of ordinary skill in the art.

The vehicle system 100 further includes an electronic combustion module 202 in electrical communication with the crankshaft sensor 114 and the ECM 200. The electronic combustion module 202 is configured to determine the temperature within a combustion chamber (i.e., the chamber temperature) of one or more cylinders 110a/110b during the compression stroke and/or the expansion stroke. That is, the electronic combustion module 202 identifies one or more cylinders 110a/110b with a closed intake valve and closed exhaust valve, for example, and determines the dynamic volume-average temperature values within the combustion chamber of the identified cylinder 110a/110b at a plurality of angular positions of the crankshaft 112. Based on the chamber temperature, the electronic combustion control module can dynamically control and adjust combustion of the air/fuel mixture within one or more cylinders 110a/110b.

According to an exemplary embodiment, the chamber temperature is based on the pressure within combustion chamber of the identified cylinder 110a/110b, the mass of air and fuel trapped in the cylinder 110a/110b, and the temperature of the charge passed from the intake manifold 104 into the cylinder 110a/110b. A chamber pressure sensor 113a/113b may be disposed within the combustion chamber of a cylinder 110a/110b to measure the pressure during the compression stroke and/or the expansion stroke. Various other sensors may provide measurements to the electronic combustion module 202. For example, the intake manifold 104 may include an intake manifold pressure sensor 115 and an intake manifold temperature sensor 117 which provide temperature and pressure measurements of the intake manifold 104, respectively. The electronic combustion module 202 may then calculate the chamber temperature based on, for example, the following equation:

$$T_{CYL} = T_{INTAKE}\left(\frac{P_{CYL}}{P_{INTAKE\_IVC}}\right)*\left(\frac{V_{CYL}}{V_{CYL\_IVC}}\right), \text{ where} \quad (1)$$

$T_{CYL}$ is the chamber temperature,
$T_{INTAKE}$ is the temperature in the intake manifold;
$P_{CYL}$ is the pressure in the combustion chamber of one or more identified cylinders during the compression stroke and/or the expansion stroke;
$P_{INTAKE\_IVC}$ is the pressure of the intake manifold at intake valve closing time;
$V_{CYL}$ is the dynamic volume of the identified cylinder with respect to any position of the piston indicated by a position of the crankshaft; and
$V_{CYL\_IVC}$ is the dynamic volume of the identified cylinder with respect to a position of the piston at intake valve closing time.

Figure 2:
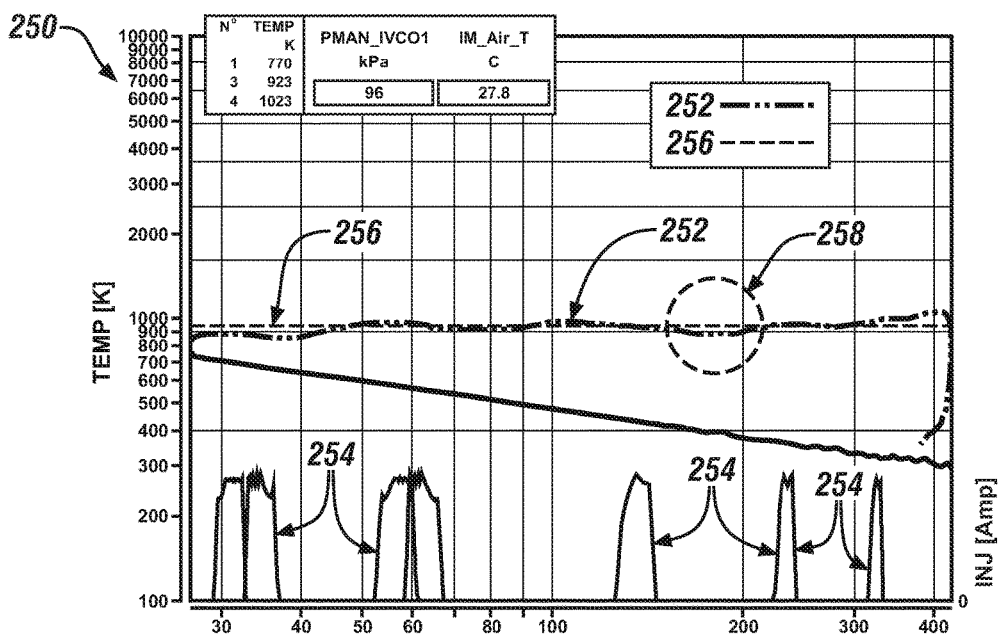
FIG. 2 is a line graph illustrating the relationship of the logarithm of cylinder temperature $\log(T_{CYL})$ versus the logarithm of cylinder volume $\log(V_{CYL})$ according to an exemplary embodiment of the present disclosure.

Referring to FIG. 2, a line graph illustrates the relationship of the logarithm of the cylinder temperature, i.e., $\log(T_{CYL})$, versus the logarithm of the cylinder volume, i.e., $\log(V_{CYL})$, according to an exemplary embodiment of the present disclosure The behavior of $T_{CYL}$ 252 in response to a series of fuel injection pulses 254 is shown with respect to an autoignition temperature threshold 256. One or more fuel injection pulses 254 can be controlled to maintain $T_{CYL}$ 252 at or above the autoignition temperature threshold 256 to ensure that efficient burn-off of the hydrocarbon fuel in combustion chamber of the identified cylinder is achieved. For example, when $T_{CYL}$ 252 is determined to exist at a low $T_{CYL}$ state 258 that falls below the autoignition temperature threshold 256 at the time $\log(V_{CYL})$ reaches approximately 180 cubic centimeters, one or more combustion parameters can be increased and/or fuel injection pulse timing advanced. The combustion parameters may include, but are not limited to, fuel injection, pulse quantity, and pulse timing. The modified fuel injection timing and/or fuel injection quantity can subsequently raise the chamber temperature so that $T_{CYL}$ 252 is brought back to, or above, the autoignition temperature threshold 256. Accordingly, the efficiency of hydrocarbon burn-off within the combustion chamber is increased.

Figure 3:
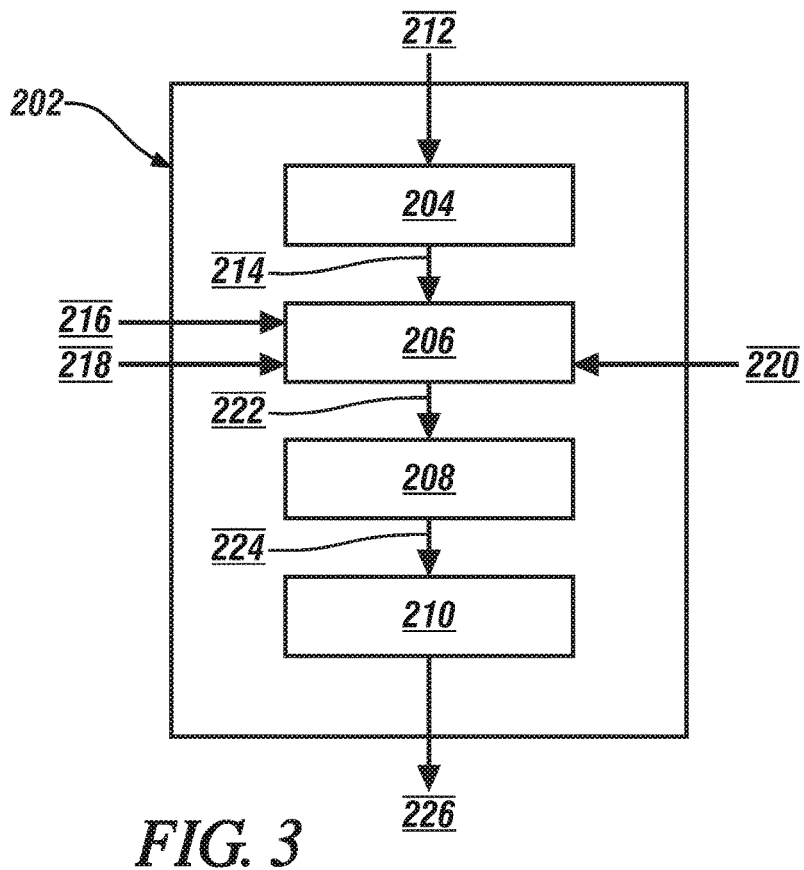
FIG. 3 is a functional block diagram illustrating an electronic combustion chamber temperature module according to an exemplary embodiment of the present disclosure.

Turning now to FIG. 3, a block diagram of an electronic combustion module 202 is illustrated according to an exemplary embodiment. The electronic combustion module 202 comprises an electronic stroke identification (ID) module 204, an electronic chamber temperature module 206, an electronic autoignition temperature module 208, and an electronic dynamic combustion control module 210. Although not illustrated, it is appreciated that the electronic combustion module 202 and/or each individual sub-module may include an electronic memory storage unit configured to store various parameters, models and/or threshold values.

The electronic stroke ID module 204 determines the stroke of one or more cylinders 110a/110b based on a position signal 212 received from the crankshaft sensor 114. As described above, each pulse of the position signal 212 corresponds to an angular rotation of the crankshaft 112. Based on the angle of the crankshaft 112, the electronic stroke ID module 204 determines the stroke of one or more cylinders 110a/110b as understood by one of ordinary skill in the art. Accordingly, the electronic stroke ID module 204 outputs a stroke ID signal 214 which identifies which cylinders 110a/110b are operating during a compression stroke and/or an expansion stroke.

The electronic chamber temperature module 206 receives the stroke ID signal 214, an intake manifold pressure signal 216 indicating the pressure ($P_{INTAKE\_IVC}$) in the intake manifold 104, and an intake manifold temperature signal 218 indicating the temperature ($T_{INTAKE}$) in the intake manifold 104. Based on the stroke ID signal 214, the electronic chamber temperature module 206 determines which cylinders 110a/110b are operating during a compression stroke and/or an expansion stroke with respect to the position of the piston 111a/111b and obtains a chamber pressure signal 220 from a respective chamber pressure sensor 113a/113b of the identified cylinders 110a/110b. The chamber pressure signal 220 indicates the chamber pressure ($P_{CYL}$) of one or more identified cylinders 110a/110b. The electronic chamber temperature module 206 can further determine the pressure of one or more identified cylinders 110a/110b at intake valve closing ($P_{INTAKE\_IVC}$) based on a the intake manifold pressure signal 218, obtain the dynamic volume signal ($V_{CYL}$) of one or more identified cylinders 110a/110b from memory, and determine the dynamic volume at intake valve closing ($V_{CYL\_IVC}$) of a respective identified cylinder 110a/110b based on the position signal 212. In this manner, the electronic chamber temperature module 206 can calculate the chamber temperature $T_{CYL}$ based on the $T_{CYL}$ equation (1), and outputs a chamber temperature signal 222 indicative of $T_{CYL}$.

The electronic autoignition temperature module 208 receives the chamber temperature signal 222 indicating the chamber temperature ($T_{CYL}$) of one or more identified cylinders 110a/110b and compares $T_{CYL}$ to an autoignition temperature threshold. The autoignition temperature threshold is set according to autoignition temperature that maximizes burn-off of hydrocarbons in the combustion chamber of a respective cylinder 110a/110b in response to autoignition of the air/fuel mixture. For example, the autoignition temperature threshold may be set to approximately 1023 degrees kelvin (° K), i.e., approximately 750 degrees Celsius (° C.), which achieves approximately 99% burn off of the hydrocarbons within the combustion chamber, given that those hydrocarbons dwell in spatial locations with sufficient oxygen and away from boundary surfaces that are cooler than the chamber mean temperature determined by the electronic autoignition temperature module 208.

According to another embodiment, a memory unit may store a plurality of autoignition temperature threshold values corresponding to a respective hydrocarbon fuel type used to drive the engine 102. Based on the type of fuel driving the engine 102, the electronic autoignition temperature module 208 retrieves the respective autoignition temperature threshold value from the memory unit. For example, when a heavy hydrocarbon fuel such as, for example, diesel fuel, is used to drive the engine 102, the electronic autoignition temperature module 208 may retrieve a corresponding autoignition temperature threshold value of approximately 1023 degrees kelvin (° K), (i.e., approximately 750° C.). When, however, ethanol is used to drive the engine 102, the electronic autoignition temperature module 208 may retrieve a corresponding autoignition temperature threshold value of approximately 638° K (i.e., approximately 365° C.). In this manner, the chamber temperature ($T_{CYL}$) can be maintained at approximately the autoignition temperature threshold corresponding to the injected fuel without substantially exceeding the autoignition temperature. Accordingly, "knock" caused by excessive temperature levels within the combustion chamber may be reduced.

The electronic autoignition temperature module 208 outputs a $T_{CYL}$ status signal 224 indicating the status of the chamber temperature ($T_{CYL}$) of a respective cylinder 110a/110b with respect to the autoignition temperature threshold. For example, the $T_{CYL}$ status signal 224 may indicate a low $T_{CYL}$ when the chamber temperature is below the autoignition temperature threshold, a nominal $T_{CYL}$ when the chamber temperature is equal or approximately equal to the autoignition temperature threshold, and a high $T_{CYL}$ when the chamber temperature exceeds the autoignition temperature threshold.

The electronic dynamic combustion control module 210 receives the $T_{CYL}$ status signal 224 and outputs a combustion control signal 226 for controlling the combustion within the combustion chamber of the identified cylinder 110a/110b. For example, the combustion control signal 226 may command the ECM 200 to adjust one or more actuators to adjust the combustion timing or dwell timing within the identified cylinder 110a/110b. Adjusting the actuators may control various combustion parameters including, but not limited to, fuel injection timing, fuel injection quantity, fuel injection pressure, boost pressure, mass airflow quantity, and swirl valve control. Accordingly, when the $T_{CYL}$ status signal 224 indicates a low $T_{CYL}$ status, the electronic dynamic combustion control module 210 can output the combustion control signal 226 which commands the ECM 200 to advance the timing of the fuel injection and/or increase the quantity of fuel injected in the identified cylinder 110a/110b. In this manner, the combustion within the combustion chamber of the identified cylinder 110a/110b is dynamically adjusted and the chamber temperature ($T_{CYL}$) is brought back to, or above, the autoignition temperature threshold. According to an embodiment, the combustion can be dynamically adjusted such that the chamber temperature is no less than the autoignition temperature threshold while the piston 111a/111b outputs a minimum torque to the crankshaft 112. In this manner, a diesel engine vehicle, for example, can idle in a stationary position while sustaining catalyst operating temperatures.

Figure 4:
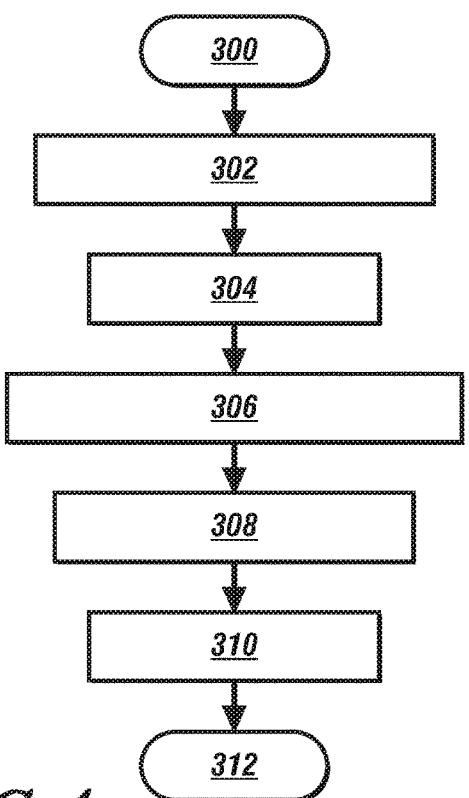
FIG. 4 is a flow diagram illustrating a method of controlling combustion within a combustion chamber of a cylinder according to an exemplary embodiment of the disclosure.

Turning now to FIG. 4, a flow diagram illustrates a method of controlling combustion within a combustion chamber of a cylinder according to an exemplary embodiment. The method begins at operation 300 and at operation 302 one or more cylinders operating during the compression stroke and/or the expansion stroke are identified. The cylinders operating during the expansion stroke and/or the expansion stroke can be identified based on a position signal identifying the rotational angle of the crankshaft. At operation 304, the chamber pressure of one or more identified cylinders (i.e., cylinders operating during the compression stroke and/or expansion stroke) is determined. At operation 306, the chamber temperature of one or more identified cylinders is determined. The chamber temperature is based on, for example, a respective chamber pressure. At operation 308, the chamber temperature is compared to an autoignition temperature threshold. The autoignition temperature threshold is based on, for example, the autoignition temperature of the fuel stored in the cylinders 110a/110b. At operation 310, the combustion within the combustion chamber of one or more identified cylinders is adjusted based on the comparison, and the method ends at operation 312. According to an embodiment, the fuel injection timing is advanced and/or the quantity of fuel injected into the cylinder is increased when, for example, the chamber temperature falls below the autoignition temperature threshold such that the combustion is dynamically adjusted. In this manner, increased hydrocarbon burn-off efficiency within the combustion chamber is achieved thereby reducing the overall emissions exhausted from the engine.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An internal combustion engine control system, comprising:
   at least one cylinder including a piston moveably disposed therein via a crankshaft, and including a combustion chamber configured to combust a mass quantity of injected fuel, wherein a plurality of fuel injections are delivered into the chamber, after initiating a compression stroke, the mass quantity of injected fuel configured to combust in response to reaching an autoignition temperature;
   an electronic autoignition temperature module configured to detect a fuel type included in the mass quantity of injected fuel among a plurality of different possible fuel types, and to determine an autoignition temperature threshold of the detected fuel type among a plurality of different autoignition temperature thresholds corresponding to the different possible fuel types;
   at least one electronic control module configured to determine a chamber temperature of the combustion chamber and to dynamically control a combustion timing of the mass quantity of injected fuel based on a comparison between the chamber temperature and the autoignition temperature threshold of the detected fuel type,
   wherein the at least one electronic control module includes an electronic dynamic combustion control module configured to output a combustion control signal that adjusts the combustion timing in response to the chamber temperature falling below the autoignition temperature threshold of the detected fuel type,
   wherein the combustion control signal dynamically adjusts the combustion timing by at least one of advancing the fuel injection time period or increasing a quantity of fuel injected during a fuel injection among a plurality of fuel injections delivered into the cylinder,
   wherein the at least one electronic control module determines a preselected volume of the cylinder based on a position of the piston indicated by a rotational angle of the crankshaft, and determines the chamber temperature at the preselected volume, and wherein the electronic dynamic combustion control module adjusts the combustion timing by initiating delivery of a plurality of fuel injections into the chamber after combustion has initiated such that the chamber combustion temperature is maintained at a target chamber temperature that matches the autoignition temperature threshold of each fuel injection among the plurality of fuel injections.

2. The internal combustion engine control system of claim 1, wherein the internal combustion engine is a diesel engine, and the internal combustion engine control system further comprises at least one fuel injector configured to deliver a quantity of fuel into the combustion chamber at an injection time period, wherein the at least one electronic control module dynamically adjusts the combustion timing of the mass quantity of injected fuel by adjusting at least one of the quantity of fuel and the injection time period.

3. The internal combustion engine control system of claim 2, further comprising:
a piston moveably disposed in the at least one cylinder
a pressure sensor configured to output a chamber pressure signal indicating a chamber pressure within the combustion chamber,
wherein the crankshaft is configured to drive the piston through a series of strokes in an engine cycle, the crankshaft including a crankshaft sensor that outputs a position signal indicating a rotational position of the crankshaft,
wherein the at least one electronic control module determines at least one of a combustion stroke and an expansion stroke of the piston based on the position signal, and is configured to determine the chamber temperature during at least one of the combustion stroke and the expansion stroke.

4. The internal combustion engine control system of claim 3, wherein the at least one electronic control module includes an electronic chamber temperature module that calculates the chamber temperature based on the chamber pressure signal.

5. The internal combustion engine control system of claim 1, wherein the chamber temperature is further based on a manifold temperature of an intake manifold, a manifold pressure of the intake manifold at an intake valve closing time, a volume of the cylinder at a plurality of positions with respect to the crankshaft, and a dynamic volume of the cylinder with respect to a position of the piston indicated by the crankshaft at the intake valve closing time.

6. The internal combustion engine control system of claim 5, wherein the autoignition temperature threshold is about 1023 degrees kelvin.

7. The internal combustion engine control system of claim 6, wherein the electronic dynamic combustion control module dynamically adjusts the combustion timing such that the chamber temperature is no less than the autoignition temperature threshold while the piston outputs a minimum torque to the crankshaft.

8. An electronic combustion module to control combustion of a mass quantity of injected fuel stored within at least one cylinder included in an internal combustion engine, the electronic combustion module comprising:
an electronic chamber temperature module configured to determine a chamber pressure within a combustion chamber of the at least one cylinder based on a rotational position of a crankshaft that drives a piston in the cylinder, and to calculate a chamber temperature of the combustion chamber based on the chamber pressure existing during at least one of the compression stroke or the expansion stroke of the piston; and
an electronic autoignition temperature module configured to detect a fuel type included in the mass quantity of injected fuel among a plurality of different possible fuel types, and to determine an autoignition temperature threshold of the detected fuel type among a plurality of different autoignition temperature thresholds corresponding to the different possible fuel types;
an electronic dynamic combustion control module in electrical communication with the electronic chamber temperature module, the electronic dynamic combustion control module configured to output a combustion control signal that dynamically adjusts a combustion time of the air/fuel mixture based on the comparison between the chamber temperature and the autoignition temperature threshold corresponding to the detected fuel type included in the air/fuel mixture, and initiates delivery of a plurality of fuel injections into the chamber after combustion has initiated such that the chamber combustion temperature is maintained at a target chamber temperature that matches the autoignition temperature threshold of each fuel injection among the plurality of fuel injections.

9. The electronic combustion module of claim 8, wherein the an internal combustion engine is a diesel engine, and wherein the combustion control signal controls operation of at least one fuel injector to adjust at least one of a quantity of fuel delivered to the at least one cylinder and a fuel injection time period for injecting the quantify of fuel.

10. The electronic combustion module of claim 9, wherein the electronic dynamic combustion control module adjusts at least one of a quantity of the after-fuel injections and a fuel injection time period for injecting the after-fuel injections in response to the chamber temperature falling below the target chamber combustion temperature such that the chamber temperature is returned to the target chamber combustion temperature.

11. A method of controlling an internal combustion engine, the method comprising:
delivering a quantity of fuel during an injection time period into a combustion chamber of at least one cylinder included in the internal combustion engine to form an air/fuel mixture; and
combusting the air/fuel mixture in the combustion chamber based on an autoignition temperature of the air/fuel mixture, wherein a plurality of fuel injections are delivered into the chamber after initiating a compression stroke;
detecting a fuel type included in the air/fuel mixture among a plurality of different possible fuel types;
determining an autoignition temperature threshold of the detected fuel type among a plurality of different autoignition temperature thresholds corresponding to the different possible fuel types;
dynamically setting a chamber temperature threshold equal to the autoignition temperature threshold of the detected fuel type;
determining a chamber temperature within the combustion chamber;
controlling the combustion of the air/fuel mixture based on a comparison between the chamber temperature and the chamber temperature threshold corresponding to the autoignition temperature threshold of the detected fuel type, wherein controlling the combustion includes outputting a combustion control signal that adjusts a combustion time in response to the chamber temperature falling below the set chamber temperature threshold corresponding to the autoignition temperature threshold of the detected fuel type; and dynamically adjusting the combustion timing by at least one of advancing the fuel injection time period or increasing a quantity of fuel injected during a fuel injection among a plurality of fuel injections delivered into the cylinder, wherein dynamically adjusting the combustion timing comprises:

determining a preselected volume of the cylinder based on a position of the piston indicated by a rotational angle of the crankshaft, and determines the chamber temperature at the preselected volume; and adjusting the combustion timing by initiating delivery of a plurality of fuel injections into the chamber after combustion has initiated such that the chamber combustion temperature is maintained at a target chamber temperature that matches the autoignition temperature threshold of each fuel injection among the plurality of fuel injections.

12. The method of claim 11, further comprising:

driving, via a crankshaft, a piston moveably disposed within the at least one cylinder through a series of strokes in an engine cycle, determining a chamber pressure within the combustion chamber with respect to a position of the piston;

determining at least one of a combustion stroke and an expansion stroke based on the position of the piston; and determining a chamber temperature within the combustion chamber during at least one of the combustion stroke and the expansion stroke.

13. The method of claim 12, further comprising determining the chamber temperature based on the chamber pressure.

14. The method of claim 13, further comprising adjusting the combustion time in response to the chamber temperature falling below the chamber temperature threshold corresponding to the autoignition temperature threshold of the detected fuel type.

15. The method of claim 14, wherein controlling the combustion time includes at least one of advancing the fuel injection time period and increasing the quantity of fuel injected into the cylinder.

16. The method of claim 15, wherein the chamber temperature is further based on a manifold temperature of an intake manifold, a manifold pressure of the intake manifold at an intake valve closing time, a volume of the cylinder at a plurality of positions with respect to the crankshaft, and a dynamic volume of the cylinder with respect to a position of the piston indicated by the crankshaft at the intake valve closing time.

17. The method of claim 16, wherein the autoignition temperature threshold is about 1023 degrees kelvin.

18. The method of claim 17, further comprising controlling the combustion time such that the chamber temperature is no less than the chamber temperature threshold corresponding to the autoignition temperature threshold of the detected fuel type while the piston outputs a minimum torque to the crankshaft.

* * * * *